Nov. 2, 1943.　　　G. L. SMITHER, JR　　　2,333,594
WELDING GLOVE
Filed May 6, 1941

WITNESSES:

INVENTOR
George L. Smither, Jr.
BY
Paul E. Friedemann
ATTORNEY

Patented Nov. 2, 1943

2,333,594

UNITED STATES PATENT OFFICE 2,333,594

WELDING GLOVE

George L. Smither, Jr., Wilkinsburg, Pa., assignor to Westinghouse Electric & Manufacturing Company, East Pittsburgh, Pa., a corporation of Pennsylvania Application May 6, 1941, Serial No. 392,043

5 Claims. (Cl. 2—161)

My invention relates to an article or material of manufacture, and more particularly to fibrous material used in the manufacture of articles of wearing apparel used by welders.

Welders' gloves that combine excellent wearing qualities with considerable heat insulating qualities are usually made of leather. Gloves made of cotton or synthetic leathers, or cotton-like material catch fire easily and are thus dangerous and when once subjected to excessive heat, though not actually set on fire, disintegrate rather rapidly. Asbestos gloves have no strength and thus have a very short useful life, and further are relatively much more expensive than gloves made of most any other material.

Leather gloves are, therefore, in universal use but even with leather gloves the casualty rate is very high in industrial welding use. Leather gloves, when subjected to a hot surface, become useless. The leather raises in swellings, or welts, becomes thick and warped, and the glove is thus subjected to very irregular and complex shrinkages. A careful investigation of leather so abused shows that its strength has not been materially affected and also that the leather is as soft as on the side not exposed to a hot surface and nearly as soft as ever on the side so exposed (depending, of course, on the degree of abuse), yet the article made of the leather, as a glove, has become useless.

One object of my invention is to very materially lessen distortions in a material of manufacture.

Another object of my invention is to minimize distortions in leather.

It is also an object of my invention to minimize distortions in a fibrous material, the fibers of which shrink when subjected to heat.

It is a still further object of my invention to substantially eliminate distortions in leather, woolen material, felt material, or other similar material, the fibers of which have the characteristic of shriveling, or shrinking, on application of heat or other shriveling agents, as chemicals.

Other objects and advantages will become apparent from a study of the following specification when considered in conjunction with the accompanying drawing, in which.

In leather, some felts, woolen goods, and other materials, the individual fibers are disposed, generally, in the plane of the material. The fibers seem to be disposed in successive layers on top of each other running, of course, in all directions within the width and length, or general plane, of the material. They are, of course, sufficiently matted and interlaced so that the material has some strength in the direction of the thickness of the material. There are, however, almost no fibers running directly perpendicular to the two outer surfaces. The angle of incidence of the fibers with the surfaces is usually very acute.

Figure 1:
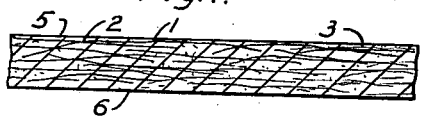
Figure 1 is an enlarged edge view of a piece of fibrous material, as leather, showing generally how the fibers are matted.

For instance, a given fiber as 1 (see Fig. 1) may run along the surface for a distance as from points 2 to 3 and at these points dips below the surface and may after traversing some distance in the material run along the other surface. But fiber 1 is so firmly secured to other surface fibers at points 2 and 3 so that any force by reason of the shortening of the fiber 1 will be transmitted to other surface fibers. This occurs also all along the region between points 2 and 3.

This simply means if the surface 5 is subjected to a fiber searing heat the surface 5 decreases in area but the surface 6 does not.

Figure 3:
Fig. 3 shows a view similar to Fig. 1, except that the surface layer of the material is shown with criss-cross cuts.
Figure 4:
Fig. 4 shows a view similar to Fig. 3 but with the surface of the material provided with the criss-cross cuts seared, thus showing criss-cross channels in the surface layer of the material.
Figure 8:
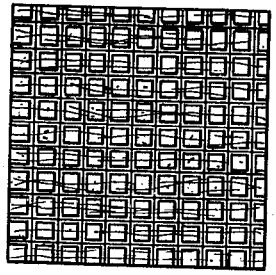
Fig. 8 shows the same area provided with shallow transverse intersecting surface cuts and shows how the area changes a relatively small amount when the surface is subjected to searing heat.

I have discovered that if these surface fibers are cut by relatively closely spaced intersecting striations, or cut by any other configurations of cuts, as circular cuts, scroll-like cuts, etc., so as to break the surface up into many small areas as shown in Figs. 3, 4 and 8, then the shrinkage is confined to the respective small areas and is not transmitted to the entire body of the material.

Figure 2:
Fig. 2 is an enlarged edge view of a piece of fibrous material, as leather, which shows the effects of having, at its upper surface, been in contact with a hot surface.
Figure 6:
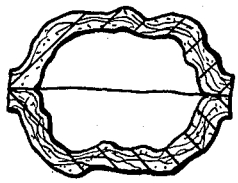
Fig. 6 shows a section similar to Fig. 5 but after the surface has been subjected to heat.
Figure 7:
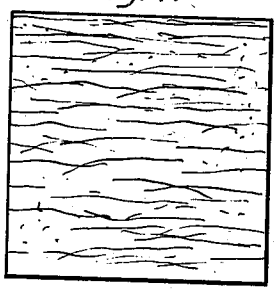
Fig. 7 shows the original area or piece of fibrous material.
Figure 9:
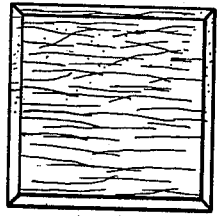
Fig. 9 shows a like material not provided with my improvement and shows how the area changes when subjected to the same amount of searing heat as applied to the material shown in Fig. 8.

Fig. 8 shows how the material shrinks a relatively small amount in area when provided with surface cuts, whereas Figs. 2, 6 and 9 show how the material shrinks a considerable amount when not provided with the shallow surface cuts.

Tests have shown that only, on an average, a 2.5% surface shrinkage takes place for a given amount of surface searing heat applied to a material as against an average of 36% surface shrinkage for the application of the same amount of surface searing heat applied to the same kind of material.

For differences in shrinkages as pointed out, it can be shown mathematically that a glove finger having a normal inside diameter of 24 millimeters will shrink to an inside diameter of between 15 and 16 millimeters.

Figure 5:
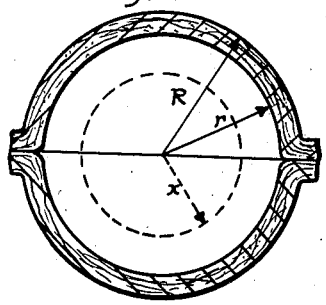
Fig. 5 shows, to a double scale, a transverse section of a finger of a glove before having a surface heated.

This is shown graphically by Figs. 5 and 6. In Fig. 5, the changes in inside dimensions of a glove finger are shown, by the dotted lines, from a mathematical point of view whereas Fig. 6 shows how the glove finger is more likely to change.

A glove made of material, cut or treated in the manner I propose, changes from an inside diameter of, say 24 mm., by no more than one millimeter and often less than a half millimeter. It is thus apparent that my glove remains useable whereas a glove not provided with my invention becomes useless after having been used to handle a piece of welding apparatus or other device, too hot for the surface fibers.

For more elaborate proof note the following:

Let the leather thickness in place on the finger of a glove be two millimeters, i. e., =2 mm.

Let the inside diameter be 24 mm., i. e. $r$, shown in Fig. 5=12 mm.

The showing in Fig. 5 is actually to double scale to better present to the eye the novel features of my invention.

Then $R=12+2=14$ mm.

Let the length in the direction of the finger length subject to a surface searing heat be 10 mm. and let the entire circumference be seared, as will often happen.

The area after the surface has been seared is found to decrease from 30% to 40%, that is, the area after searing may, on an average, be .64 of the original.

New or seared area $=2R\pi 6.4$.

This means that the length in line with the finger length is, after searing, .8 of the original and the circumference is .8 of the original. The volume of the seared material may even increase, since there is considerable thickening of the shortened seared fibers, but to show the advantages of my invention I can even consider the volume as remaining unchanged.

Then, it can be shown that the new inside diameter will $=2x$, or 15.55 mm.

The inside diameter has thus changed from 24 mm. to 15.55 mm., and the glove becomes useless.

On the other hand, if the surface fibers are cut so that the region of contact with the hot welding equipment are divided in small areas, which areas may have any suitable shape, then the shrinkage for a like amount of searing is only from 2% to 3%. The average shrinkage may be considered as 2.5%. The inside diameter will thus be 23.6 mm. or only decreased by .4 mm. The glove thus fits as good as ever.

Only the individual areas shrink at the surface thus making the cuts spread as shown in Fig. 4. The glove thus has connecting air channels at the working surface and the heat insulating qualities of the gloves are very markedly improved. Further, heat is much more readily dissipated from the working surface and the glove is kept cooler.

I am, of course, aware that others, particularly after having had the benefit of my teachings, may devise other means of preventing shrinkage of fibrous materials, but my invention is not limited to the particular showing made but is to be limited only by the claims hereto attached.

I claim as my invention:

1. A leather welder's glove, having its wearing surface striated by a multitude of cuts thus forming many relatively small projecting areas so that each projeection during use is surrounded on four sides by air and is subjected to the effects of use only at the upper side of the projection.

2. A leather welder's glove, having its surface striated by a multitude of cuts thus forming many rectangular projections whose upper surfaces have relatively small areas and whose height is also relatively small in relation to the thickness of the leather material, whereby each projection is in use surrounded by air on four sides thus increasing the heat insulating qualities of the material, and is subjected to the effects of use only at the top surface of the projection.

3. A welder's glove of leather having scored outer surfaces to break up the continuity of the surface fibers to thus minimize shrinking of the glove when its outer surface is subjected to a hot surface.

4. An article of manufacture comprising a piece of fibrous flat leather material which, under normal operating conditions of the article, has one of its surfaces subjected to a shrinking or shriveling agent and in which most fibers run crisscross in all directions in the general plane of the material and but very few run in the direction of thickness, said piece of material being provided with relatively shallow cuts in said surface so made as to divide the surface area into a plurality of relatively small areas to thus confine the shrinking or shriveling to the small individual areas when the material is subjected to said agent for preventing the entire piece from being distorted.

5. A protective glove made of a fibrous material, which has its fibers extending predominantly in directions substantially in parallel to the wearing surface of the glove, and for normal use in contact with an agent apt to cause shrinkage of said fibers, said glove having said wearing surface broken into many small areas so as to disrupt the continuity of the surface fibers as to their extent along said surface in order to permit the surface portion of any of said areas to shrink substantially independently of that of other areas.

GEORGE L. SMITHER, Jr.